United States Patent
Czerwinski, Jr.

(10) Patent No.: US 11,372,445 B2
(45) Date of Patent: Jun. 28, 2022

(54) ELECTRONIC DEVICE DISPLAY ASSEMBLY

(71) Applicant: Robert P. Czerwinski, Jr., Northlake, IL (US)

(72) Inventor: Robert P. Czerwinski, Jr., Northlake, IL (US)

( * ) Notice: Subject to any disclaimer, the term of this patent is extended or adjusted under 35 U.S.C. 154(b) by 50 days.

(21) Appl. No.: 16/996,536

(22) Filed: Aug. 18, 2020

(65) Prior Publication Data

US 2022/0057833 A1   Feb. 24, 2022

(51) Int. Cl.
*G06F 1/16* (2006.01)
*F16M 11/04* (2006.01)
*F16M 11/08* (2006.01)

(52) U.S. Cl.
CPC ......... *G06F 1/1607* (2013.01); *F16M 11/041* (2013.01); *F16M 11/08* (2013.01); *G06F 1/1605* (2013.01)

(58) Field of Classification Search
CPC .... G06F 1/1605; G06F 1/1607; G06F 1/1632; G06F 1/1654; F16M 11/08; F16M 11/18; F16M 11/041; H04R 5/02; A47F 5/02; Y10T 16/52
USPC .................................................. 361/679.02
See application file for complete search history.

(56) References Cited

U.S. PATENT DOCUMENTS

| | | | |
|---|---|---|---|
| 5,078,386 A | 1/1992 | Hou | |
| D429,212 S | 8/2000 | Oden, II | |
| 9,903,533 B2 | 2/2018 | Wei | |
| 10,348,874 B2 | 7/2019 | Penfold | |
| 10,462,347 B2 * | 10/2019 | Guyot | H04N 5/23203 |
| 10,554,896 B2 | 2/2020 | Birkler | |
| 10,620,507 B2 * | 4/2020 | Lefever | F16M 13/022 |
| 2007/0014080 A1 * | 1/2007 | McCormack | G06F 1/1632 |
| | | | 361/679.41 |
| 2012/0315016 A1 * | 12/2012 | Fung | H04N 5/2252 |
| | | | 348/222.1 |
| 2019/0195422 A1 | 6/2019 | Nhan | |
| 2021/0191469 A1 * | 6/2021 | Li | G06F 1/1681 |
| 2021/0211536 A1 * | 7/2021 | Knoppert | F16M 11/08 |

* cited by examiner

*Primary Examiner* — Adrian S Wilson
*Assistant Examiner* — Gage Crum

(57) ABSTRACT

An electronic device display assembly includes a base that includes a first disk which is rotatably coupled to a second disk and the first disk can be positioned on a support surface. A pair of clips is each coupled to the second disk and each of the clips engages an electronic device for displaying the electronic device in an upright orientation. A rotation unit is integrated into the base and the rotation unit engages the second disk. Additionally, the rotation unit rotates the second disk when the rotation unit is turned on to enhance the visual appeal of the electronic device. A speaker is integrated into the base to emit audible sounds outwardly therefrom.

8 Claims, 5 Drawing Sheets

ELECTRONIC DEVICE DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to display devices and more particularly pertains to a new display device for displaying an electronic device in an upright orientation.

(2) Description of Related Art Including Information Disclosed Under 37 CFR 1.97 and 1.98

The prior art relates to display devices including an ornamental carousel assembly that includes a rotating disk and audible sounds. The prior art discloses a tri-axial stabilizer for a mobile phone. Additionally, the prior art discloses a variety of couplers for attaching a mobile electronic device to a stand or a mount. The prior art discloses a disk that has a slot therein for insertably receiving an electronic device to display the electronic device in an upright orientation. The prior art also discloses a pan and tilt tripod for a mobile electronic device. The prior art discloses a disk that has a robotic grip thereon for gripping an electronic device in order to display the electronic device.

BRIEF SUMMARY OF THE INVENTION

An embodiment of the disclosure meets the needs presented above by generally comprising a base that includes a first disk which is rotatably coupled to a second disk and the first disk can be positioned on a support surface. A pair of clips is each coupled to the second disk and each of the clips engages an electronic device for displaying the electronic device in an upright orientation. A rotation unit is integrated into the base and the rotation unit engages the second disk. Additionally, the rotation unit rotates the second disk when the rotation unit is turned on to enhance the visual appeal of the electronic device. A speaker is integrated into the base to emit audible sounds outwardly therefrom.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
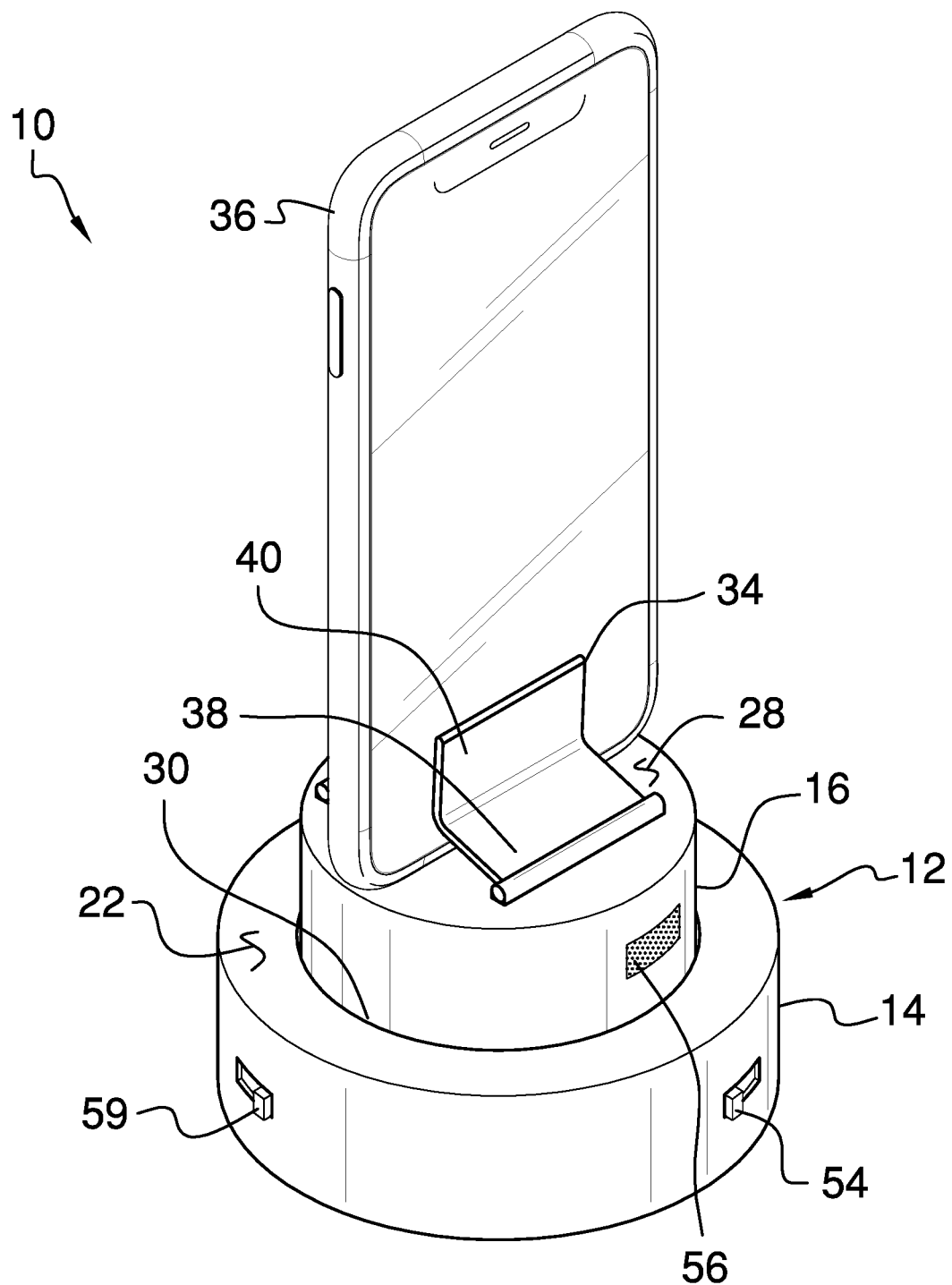
FIG. 1 is a front perspective view of an electronic device display assembly according to an embodiment of the disclosure.
Figure 2:
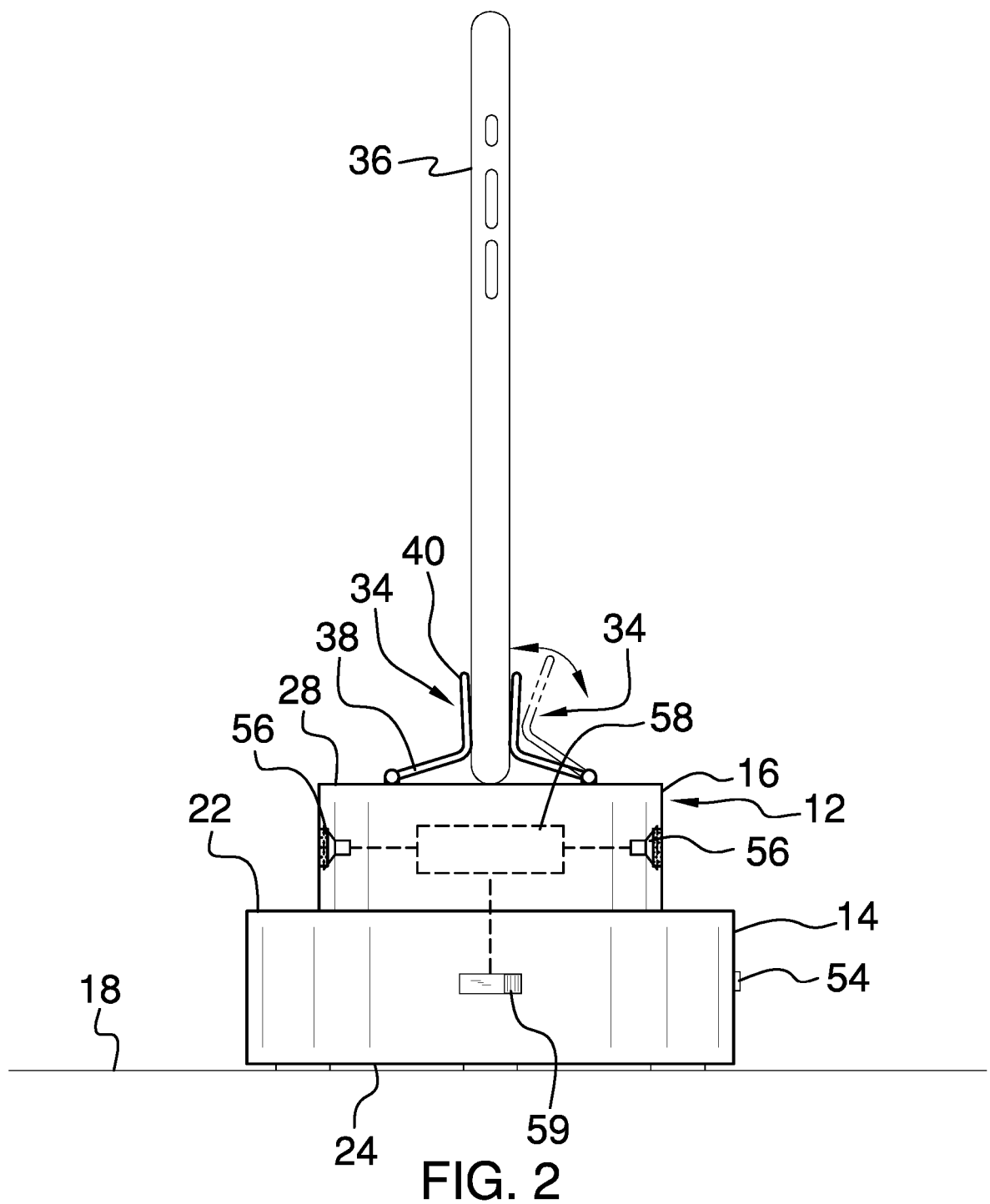
FIG. 2 is a right side view of an embodiment of the disclosure.
Figure 3:
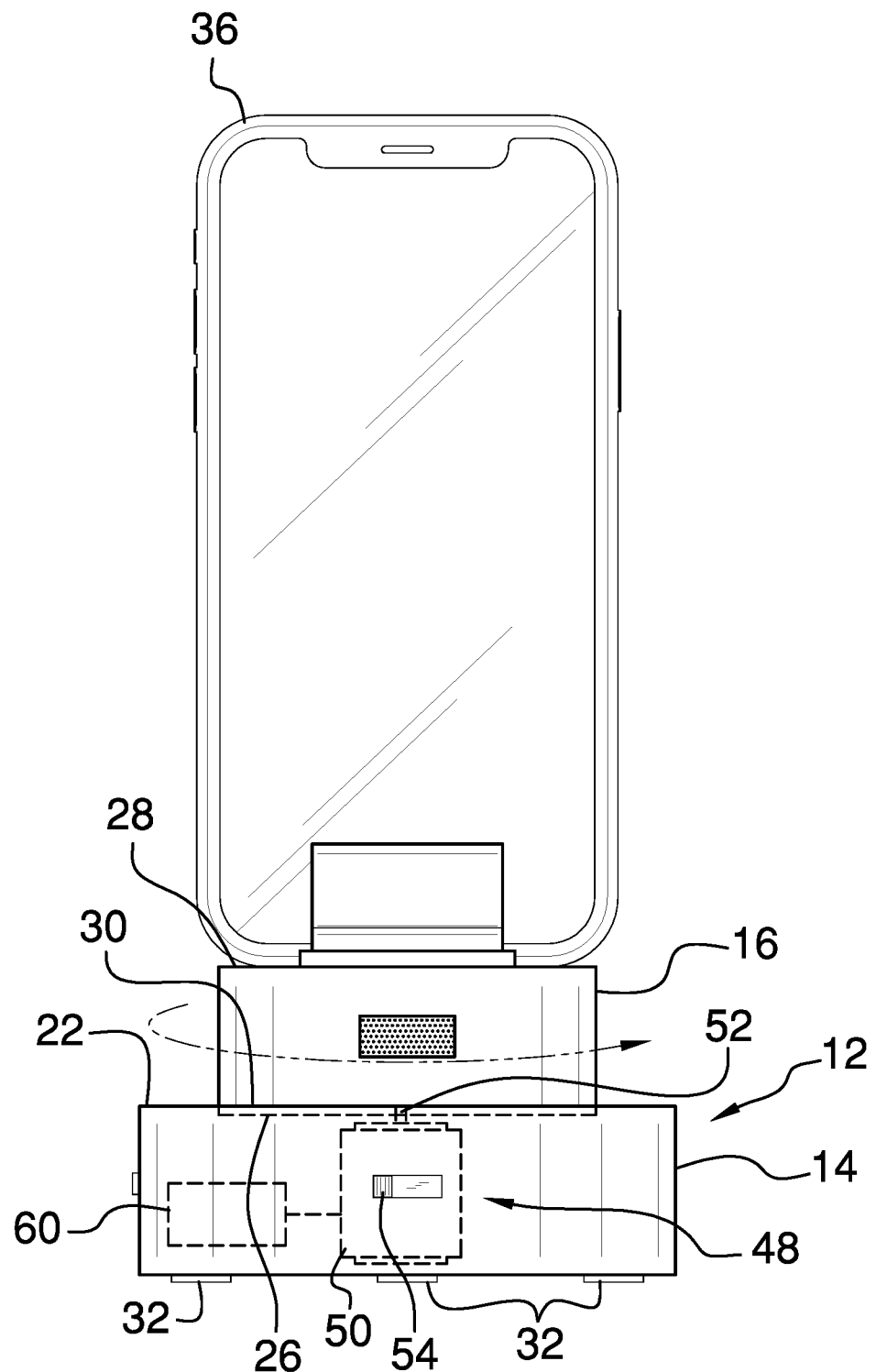
FIG. 3 is a front view of an embodiment of the disclosure.
Figure 4:
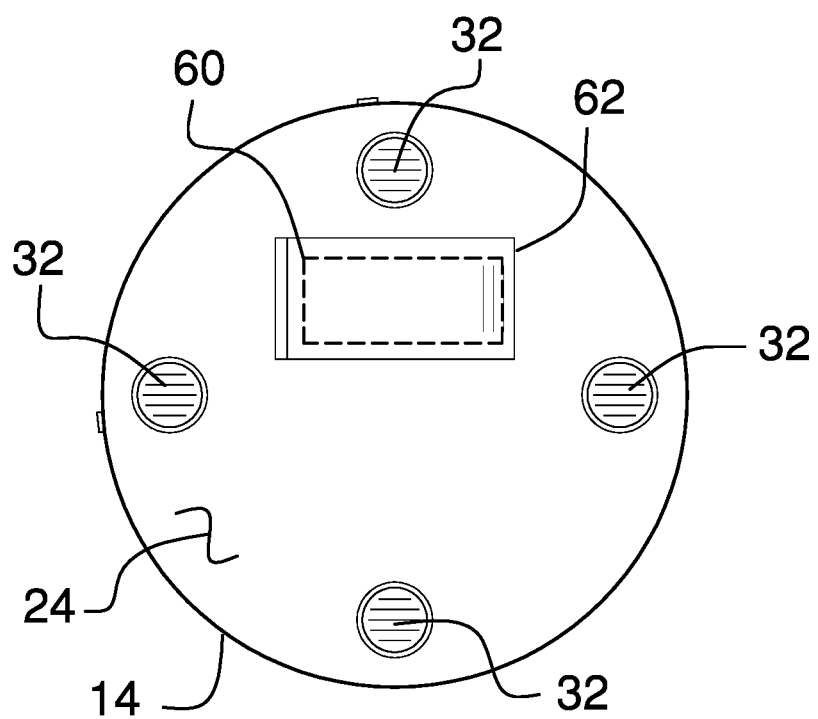
FIG. 4 is a bottom view of an embodiment of the disclosure.
Figure 5:
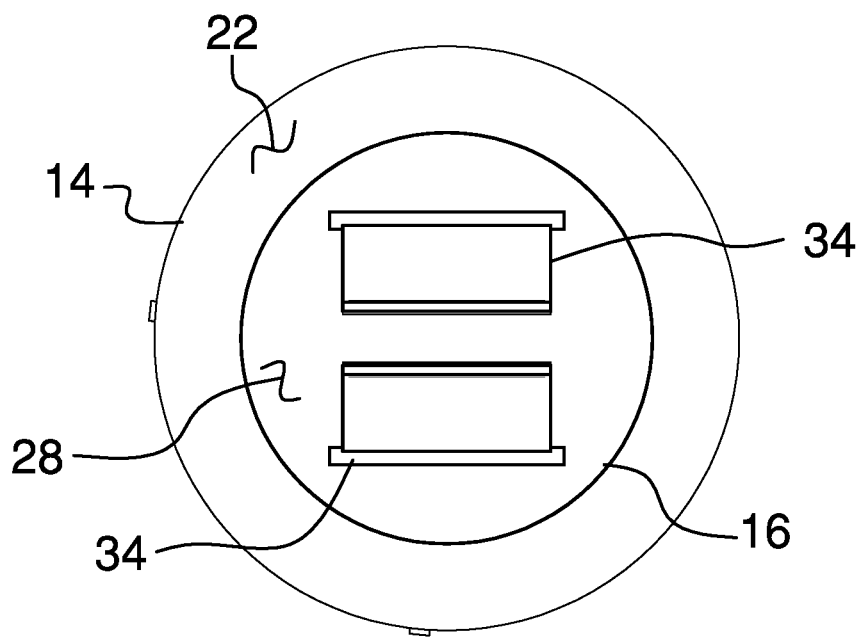
FIG. 5 is a top view of an embodiment of the disclosure.
Figure 6:
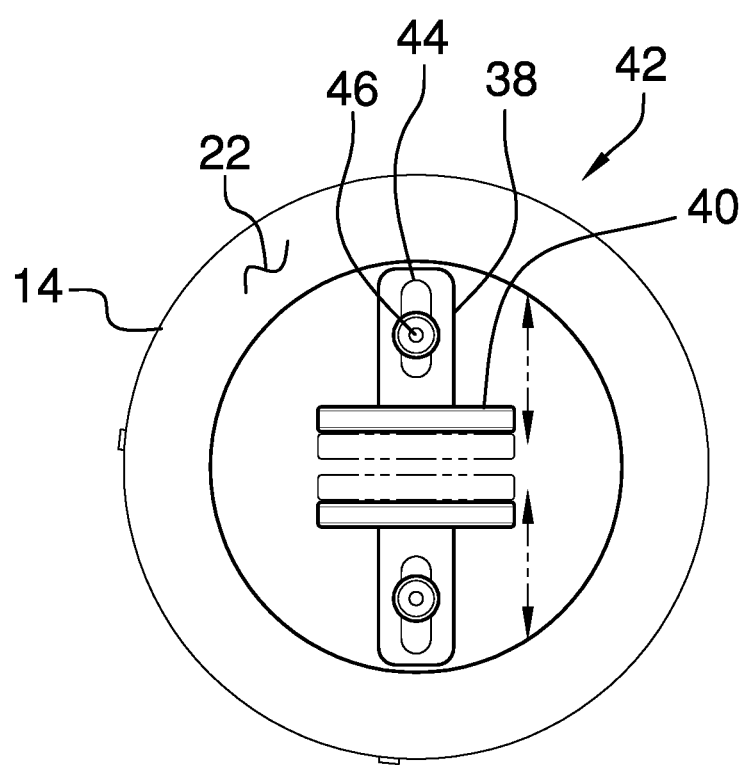
FIG. 6 is a top view of an alternative embodiment of the disclosure.

With reference now to the drawings, and in particular to FIGS. 1 through 6 thereof, a new display device embodying the principles and concepts of an embodiment of the disclosure and generally designated by the reference numeral 10 will be described.

As best illustrated in FIGS. 1 through 6, the electronic device display assembly 10 generally comprises a base 12 comprising a first disk 14 rotatably coupled to a second disk 16 and the first disk 14 can be positioned on a support surface 18. The first disk 14 has a top surface 22 and a bottom surface 24, and the second disk 16 has a lower surface 26 and an upper surface 28. The top surface 22 has a well 30 extending toward the bottom surface 24 and the second disk 16 is positioned in the well 30 having the lower surface 26 being positioned in the well 30. A plurality of feet 32 is each coupled to the bottom surface 24 of the first disk 14 to rest against the support surface 18. The support surface 18 may be a table top or other similar horizontal support surface 18.

A pair of clips 34 is each coupled to the second disk 16 to engage an electronic device 36 for displaying the electronic device 36 in an upright orientation. The electronic device may be a smart phone, an electronic tablet or any other type of personal electronic device. Each of the clips 34 comprises a first section 38 forming an angle with a second section 40. The first section 38 of each of the clips 34 is coupled to the upper surface 28 of the second disk 16 having the second section 40 of each of the clips 34 extending upwardly from the upper surface 28. The clips 34 are aligned with each other having the second section 40 of each of the clips 34 being spaced apart from each. In this way the electronic device 36 can be positioned between the second section 40 of the clips 34. Moreover, the second section 40 of each of the clips 34 is biased toward each other to compress against the electronic device 36 for retaining the electronic device 36 in a vertical orientation. In an alternative embodiment 42 as is most clearly shown in FIG. 6, the first section 38 may have a slot 44 therein and the slot 44 may slidably engage a pin 46 that extends upwardly from the upper surface 28 of the second disk 16. In this way the clips 34 can be slid toward or away from each other for accommodating various sizes of electronic devices.

A rotation unit 48 is integrated into the base 12 and the rotation unit 48 engages the second disk 16. The rotation unit 48 rotates the second disk 16 when the rotation unit 48 is turned on to enhance the visual appeal of the electronic device 36. The rotation unit 48 comprises a motor 50 that is positioned in the first disk 14. The motor 50 has a drive shaft 52 coupled thereto and the drive shaft 52 engages the lower surface 26 of the second disk 16. The drive shaft 52 rotates the second disk 16 about an axis extending through the upper surface 28 and the lower surface 26 of the second disk 16 when the motor 50 is turned on. The rotation unit 48 includes a rotate switch 54 that is slidably coupled to the first disk 14 and that is electrically coupled to the motor 50. The rotate switch 54 turns the motor 50 on and off.

A speaker 56 is integrated into the base 12 to emit audible sounds outwardly therefrom and the speaker 56 is positioned on the second disk 16. An electronic memory 58 is integrated into the second disk 16 and the electronic memory 58 is electrically coupled to the speaker 56. The electronic memory 58 stores a database comprising digital audio such that the speaker 56 emits the music. A speaker switch 59 is slidably coupled to the first disk 14, the speaker switch 59 is electrically coupled to the speaker 56 and the speaker switch 59 turns the speaker 56 on and off. A power supply 60 is positioned in the base 12, the power supply 60 is electrically coupled to the rotate switch 54 and the speaker switch 59, and the power supply 60 comprises at least one battery. A battery cover 62 is removably coupled to the bottom surface 24 of the first disk 14 and the power supply 60 is positioned beneath the battery cover 62.

In use, the base 12 is positioned on a table or other horizontal support surface 18 and the electronic device 36 is positioned between the clips 34. In this way the electronic device 36 is retained in an upright orientation on the base 12. The rotate switch 54 can be manipulated to turn on the motor 50 and subsequently rotate the second disk 16. In this way the electronic device 36 is rotated for an appealing visual effect. Additionally, the speaker switch 59 can be manipulated to turn on the speaker 56 for emitting the music.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic device display assembly for displaying an electronic device, said assembly comprising:

a base comprising a first disk being rotatably coupled to a second disk wherein said first disk is configured to be positioned on a support surface, wherein said first disk has a top surface and a bottom surface, said second disk having a lower surface and an upper surface, said top surface having a well extending toward said bottom surface, said second disk being positioned in said well having said lower surface being positioned in said well;

a pair of clips, each of said clips being coupled to said second disk wherein each of said clips is configured to engage an electronic device for displaying the electronic device in an upright orientation, wherein each of said clips comprises a first section forming an angle with a second section, said first section of each of said clips being pivotally coupled to said upper surface of said second disk having said second section of each of said clips extending upwardly from said upper surface, wherein said clips are aligned with each other having said second section of each of said clips being spaced apart from each other wherein said second section of each of said clips is configured to have the electronic device positioned therebetween, said second section of each of said clips being biased toward each other wherein said second section of each of said clips is configured to compress against the electronic device for retaining the electronic device in a vertical orientation;

a rotation unit being integrated into said base, said rotation unit engaging said second disk, said rotation unit rotating said second disk when said rotation unit is turned on wherein said rotation unit is configured to enhance the visual appeal of the electronic device; and a speaker being integrated into said base wherein said speaker is configured to emit audible sounds outwardly therefrom.

2. The assembly according to claim 1, further comprising a plurality of feet, each of said feet being coupled to said bottom surface of said first disk wherein each of said feet is configured to rest against the support surface.

3. The assembly according to claim 1, wherein said rotation unit comprises a motor being positioned in said first disk, said motor having a drive shaft being coupled thereto, said drive shaft engaging said lower surface of said second disk, said drive shaft rotating said second disk about an axis extending through said upper surface and said lower surface of said second disk when said motor is turned on.

4. The assembly according to claim 3, wherein said rotation unit comprises a rotate switch being slidably coupled to said first disk, said rotate switch being electrically coupled to said motor, said rotate switch turning said motor on and off.

5. The assembly according to claim 1, further comprising an electronic memory being integrated into said second disk, said electronic memory being electrically coupled to said speaker, said electronic memory storing a database comprising music wherein said speaker is configured to emit the music.

6. The assembly according to claim 1, further comprising a speaker switch being slidably coupled to said first disk, said speaker switch being electrically coupled to said speaker, said speaker switch turning said speaker on and off.

7. The assembly according to claim 1, further comprising:
- a speaker switch being slidably coupled to said first disk;
- a rotate switch being slidably coupled to said first disk; and
- a power supply being positioned in said base, said power supply being electrically coupled to said rotate switch and said speaker switch, said power supply comprising at least one battery.

8. An electronic device display assembly for displaying an electronic device, said assembly comprising:
- a base comprising a first disk being rotatably coupled to a second disk wherein said first disk is configured to be positioned on a support surface, said first disk having a top surface and a bottom surface, said second disk having a lower surface and an upper surface, said top surface having a well extending toward said bottom surface, said second disk being positioned in said well having said lower surface being positioned in said well;
- a plurality of feet, each of said feet being coupled to said bottom surface of said first disk wherein each of said feet is configured to rest against the support surface;
- a pair of clips, each of said clips being coupled to said second disk wherein each of said clips is configured to engage an electronic device for displaying the electronic device in an upright orientation, each of said clips comprising a first section forming an angle with a second section, said first section of each of said clips being pivotally coupled to said upper surface of said second disk having said second section of each of said clips extending upwardly from said upper surface, said clips being aligned with each other having said second section of each of said clips being spaced apart from each other wherein said second section of each of said clips is configured to have the electronic device positioned therebetween, said second section of each of said clips being biased toward each other wherein said second section of each of said clips is configured to compress against the electronic device for retaining the electronic device in a vertical orientation;
- a rotation unit being integrated into said base, said rotation unit engaging said second disk, said rotation unit rotating said second disk when said rotation unit is turned on wherein said rotation unit is configured to enhance the visual appeal of the electronic device, said rotation unit comprising:
  - a motor being positioned in said first disk, said motor having a drive shaft being coupled thereto, said drive shaft engaging said lower surface of said second disk, said drive shaft rotating said second disk about an axis extending through said upper surface and said lower surface of said second disk when said motor is turned on; and
  - a rotate switch being slidably coupled to said first disk, said rotate switch being electrically coupled to said motor, said rotate switch turning said motor on and off;
- a speaker being integrated into said base wherein said speaker is configured to emit audible sounds outwardly therefrom, said speaker being positioned on said second disk;
- an electronic memory being integrated into said second disk, said electronic memory being electrically coupled to said speaker, said electronic memory storing a database comprising music wherein said speaker is configured to emit the music;
- a speaker switch being slidably coupled to said first disk, said speaker switch being electrically coupled to said speaker, said speaker switch turning said speaker on and off; and
- a power supply being positioned in said base, said power supply being electrically coupled to said rotate switch and said speaker switch, said power supply comprising at least one battery.

\* \* \* \* \*